UNITED STATES PATENT OFFICE.

WILLIAM H. ADAMS, OF MONTREAL, QUEBEC, CANADA, ASSIGNOR OF ONE-HALF TO HENRY U. BECK, OF MONTREAL, CANADA.

METHOD OF MAKING RUBBER HOSE.

No. 834,351.     Specification of Letters Patent.     Patented Oct. 30, 1906.

Application filed July 23, 1906. Serial No. 327,390.

*To all whom it may concern:*

Be it known that I, WILLIAM HENRY ADAMS, a subject of the King of Great Britain, residing in the city and district of Montreal, in the Province of Quebec, Canada, have invented certain new and useful Improvements in Methods of Making Rubber Hose; and I do hereby declare that the following is a full, clear, and exact description of the invention, such as will enable others skilled in the art to which it appertains to make and use the same.

My invention relates to a method of making rubber hose.

The object of my invention is to provide a method by which standard-length hose may be made comprising an inner fabric and inner and outer coating of rubber.

A further object of my invention is to provide a method by means of which the rubber will not be "overcured" or burned; and my invention consists of the steps herein described and claimed.

First. A tube of rubber is formed in any suitable way in the art of making rubber hose.

Second. The rubber tubes after being formed are placed in a vulcanizer in collapsed condition, preferably in bunches or bundles. While in the vulcanizer they are partly "cured," so that they may be handled and so that they will not stick or tear when inserted in a woven tube or when a mandrel is inserted into the partly-cured rubber tubes.

Third. The partly-cured rubber tubes are then coated on their outside surface with a cementitious composition which will soften under heat.

Fourth. The partly-cured and cement-covered tubes are then drawn in deflated condition into a tubular woven or knitted body. Being partly cured, the tubes of rubber do not stick or tear in this step, thereby making it possible to form standard-length hose-sections, it hitherto having been very difficult to draw a tube of uncured rubber into a section of woven or knitted tube.

Fifth. By means of well-known apparatus applied to the ends of the tubes so inserted into the tube of woven material the ends of the tubes are closed and live steam under pressure admitted thereto. The heat from the steam softens the cementitious material on the outer surface of the rubber tube, and the pressure of the steam distends the tube, so that the cementitious material enters into the interstices of the woven tube, and thereby binds the inner tube of rubber to the woven tube, so that the inner tube is perfectly smooth. Further, the heat of the live steam further cures the inner tube of rubber, which has been partly cured in the vulcanizer, but at the same time any danger of overcuring or burning the inner tube is avoided, as would be the case where a heated hollow mandrel was used.

Sixth. As soon as the inner tube of rubber has been sufficiently expanded and cured and the cementitious matter has joined the rubber tube to the woven tube the inner tube is cooled by the admission of water or otherwise, so that the curing of the inner tube is immediately stopped and the inner surface thereof is slightly hardened to permit the ready insertion of a mandrel.

Seventh. A cold hollow mandrel is then inserted into the cooled tube, and both of these being cold they readily slide upon each other. A suitable powdered lubricant, such as graphite or soapstone, may be applied, if necessary.

Eighth. An outer covering of rubber is then formed on the outer surface of the woven tube from sheet stock, as is commonly done in the art.

Ninth. A continuous wet bandage of fabric is then wound about the outer surface of the outer tube of rubber, preferably in two or three layers.

Tenth. The hose thus formed is placed in a vulcanizer in bunches or bundles and finally cured by the application of live steam. By the application of the wet bandages the outer surface of the tube is prevented from overcuring or burning, while the hollow mandrels maintain the hose in perfect shape and protect the inner surfaces of the inner rubber tubes from too great heat.

Of the foregoing steps I do not specifically claim those numbered one, three, four, five, six, seven, and eight, as they are old in the art, it being more specifically the object of my invention to partly cure in a deflated condition the inner tubes of rubber to prevent their tearing or sticking, so that they may be operated upon as described, and to prevent the overcuring of the completed hose by the application of wet bandages, which also serve to retain the hose in its proper shape, being tightly wound thereon after the hollow mandrel is inserted therein.

It will be understood, of course, that the protecting-covering of wet bandages is removed as soon as the hose is fully vulcanized or cured.

Having thus fully described my invention, what I claim as new, and desire to secure by Letters Patent, is—

1. The herein-described method of making fire-hose, which consists in partly curing a wholly-vulcanizable rubber tube, inserting the tube into a tube of fabric and causing it to adhere thereto, applying a coating of rubber to the outer surface of the tube of fabric, applying a protecting-covering to the outer surface of the rubber to prevent overcuring, and fully curing the inner and outer rubber surfaces.

2. The herein-described method of making fire-hose, which consists in partly curing a wholly-vulcanizable rubber tube, inserting the tube into a tube of fabric, further curing the rubber tube and causing it to adhere to the woven tube, applying a coating of rubber to the outer surface of the tube of fabric, applying a protecting-covering to the outer surface of the rubber to prevent overcuring, and fully curing the inner and outer rubber surfaces.

3. The herein-described method of making fire-hose, which consists in partly curing a wholly-vulcanizable rubber tube, inserting the tube into a tube of fabric, closing the ends of the rubber tube and admitting live steam to the interior of the rubber tube, cooling the rubber tube, inserting a cold hollow mandrel into the rubber tube, applying a coating of rubber to the outer surface of the tube of fabric, applying a removable protecting-covering to the outer surface of the rubber to prevent overcuring, and fully curing the inner and outer rubber surfaces.

4. The herein-described method of making fire-hose, which consists in partly curing a wholly-vulcanizable rubber tube, inserting the tube into a tube of fabric, further curing the rubber tube and distending the same to adhere to the tube of fabric, passing a cooling medium through the inside of the rubber tube, inserting a cold hollow mandrel inside of the tube of rubber, applying a protecting-covering to the outer surface of the rubber coating to prevent overcuring, and fully curing the inner and outer rubber surfaces.

5. The herein-described method of making rubber hose, which consists in partly curing a wholly-vulcanizable rubber tube, inserting the tube into the tube of fabric, maintaining the tubes of rubber and fabric in a desired shape, applying an outer coating of rubber to the tube of fabric, applying a protecting-covering of fabric to the outer surface of the rubber to prevent overcuring; and fully curing the inner and outer rubber surfaces.

6. The herein-described method of making rubber hose, which consists in partly curing a wholly-vulcanizable rubber tube, inserting the tube into the tube of fabric, maintaining the tubes of rubber and fabric in a desired shape, applying an outer coating of rubber to the tube of fabric, applying a protecting-covering of continuous wet fabric to the outer surface of the rubber to prevent overcuring, and fully curing the inner and outer rubber surfaces.

In witness whereof I have hereunto set my hand in the presence of two witnesses.

WILLIAM H. ADAMS.

Witnesses:
T. MYNARD,
C. C. COUSINS.